A. CAMPBELL.
CONVERTIBLE FREIGHT CAR.
APPLICATION FILED APR. 29, 1910.
1,071,029.
Patented Aug. 26, 1913.
5 SHEETS—SHEET 1.
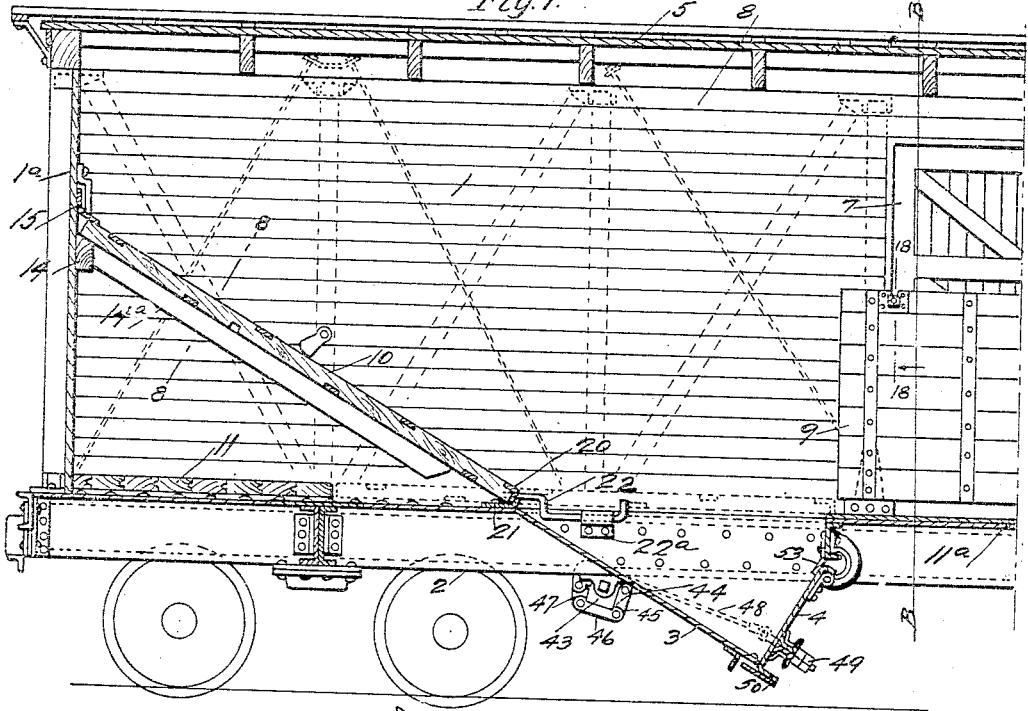
Witnesses:
F. B. Townsend
H. W. ...
Inventor
Argyle Campbell
B. Munday, Evarts, Adcock & Clarke
his Attys A. CAMPBELL.
CONVERTIBLE FREIGHT CAR.
APPLICATION FILED APR. 29, 1910.
1,071,029.
Patented Aug. 26, 1913.
5 SHEETS—SHEET 2.
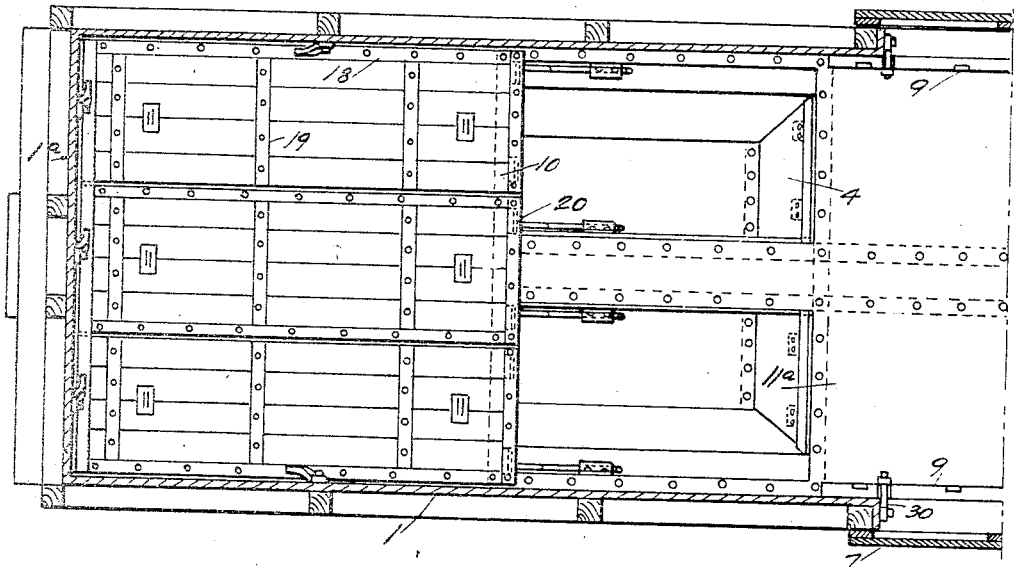
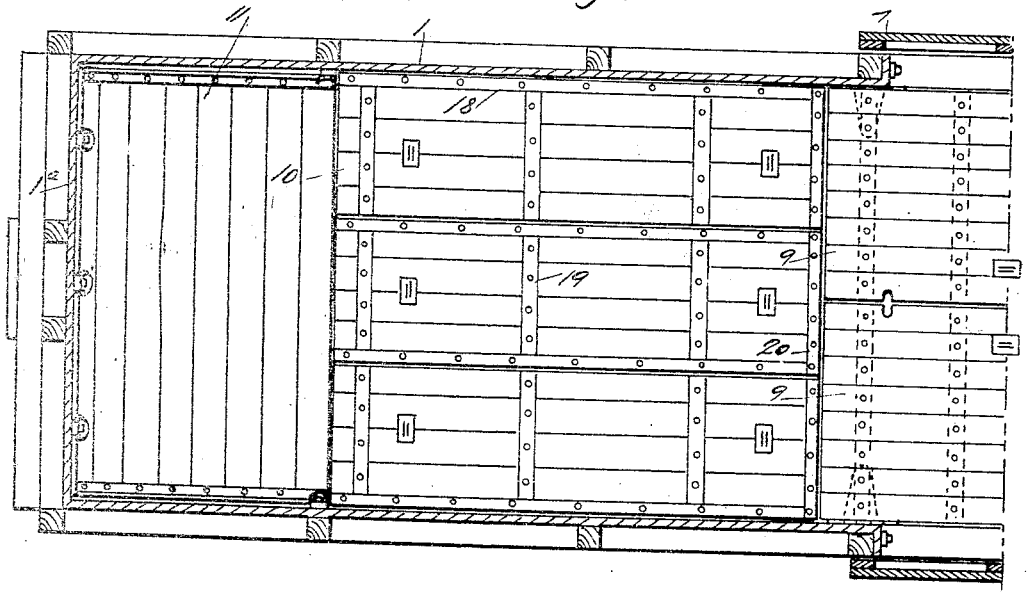
Witnesses:
F. B. Townsend
Inventor:
Argyle Campbell
By Munday, Evarts, Adcock & Clarke,
his Att'ys.

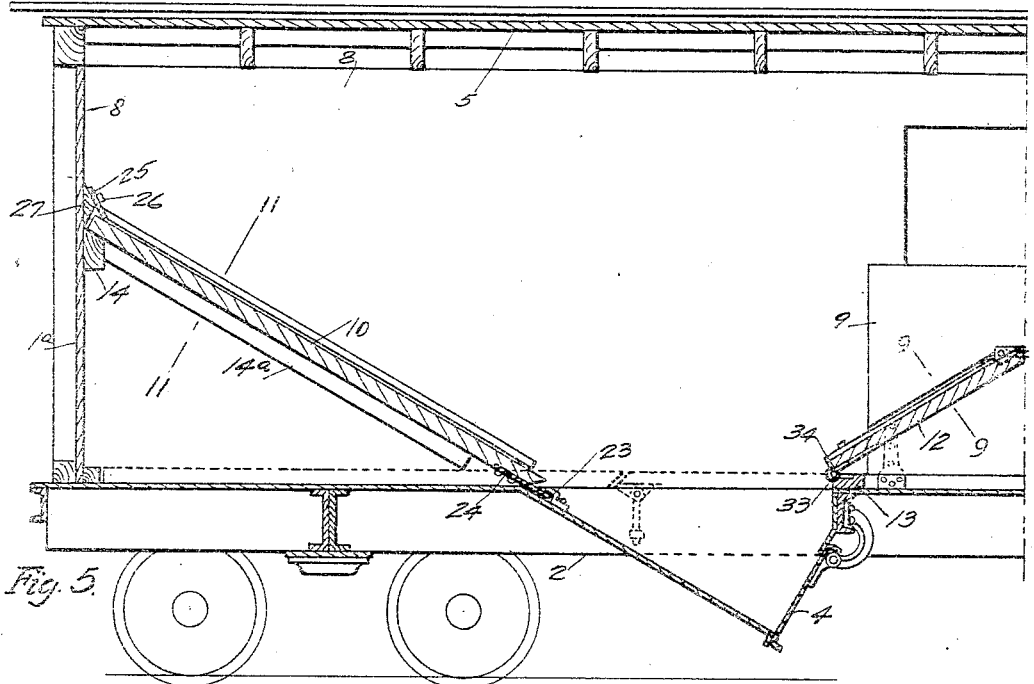
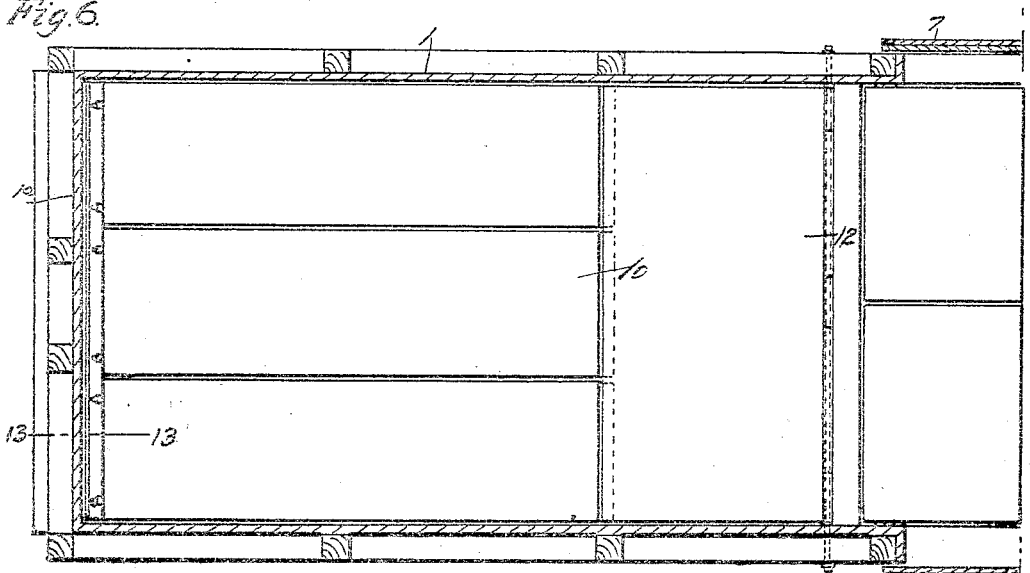
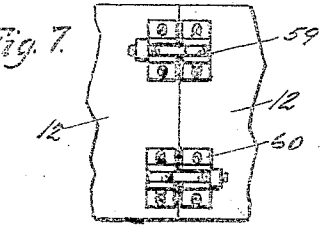

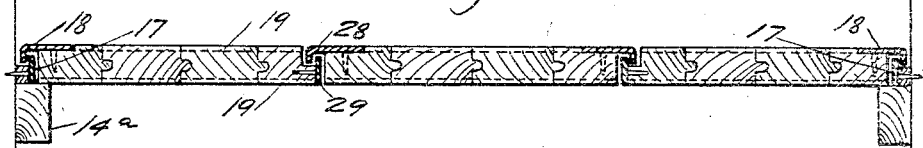
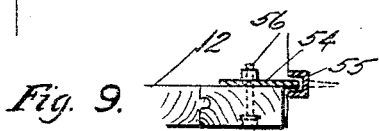
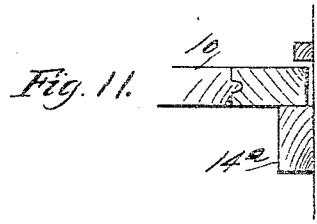
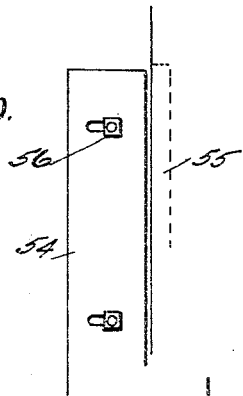
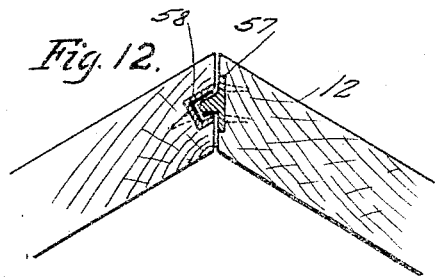
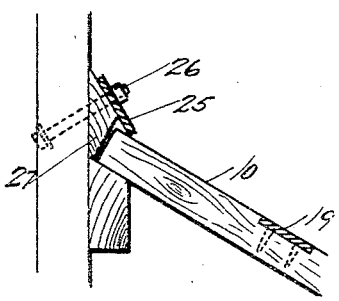
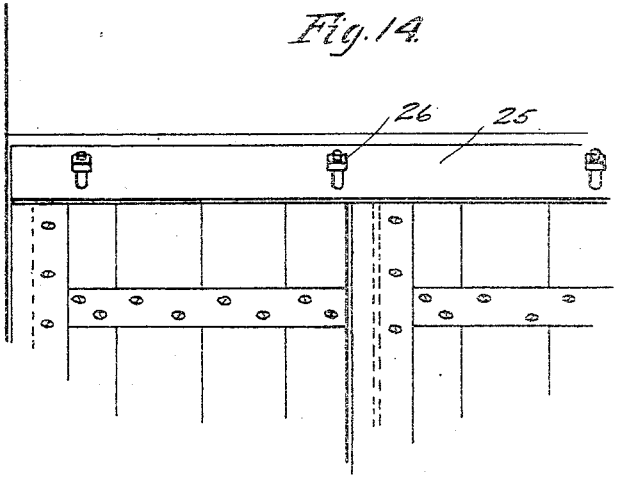

A. CAMPBELL.
CONVERTIBLE FREIGHT CAR.
APPLICATION FILED APR. 29, 1910.
1,071,029.  Patented Aug. 26, 1913.
5 SHEETS—SHEET 5.
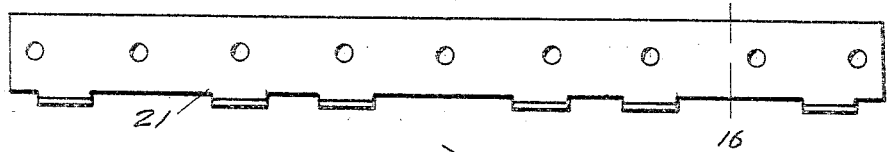
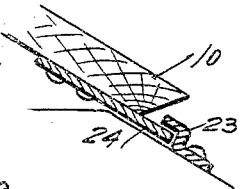
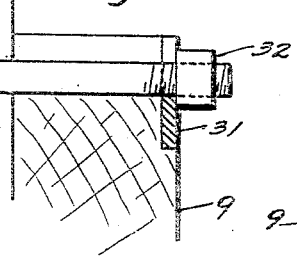
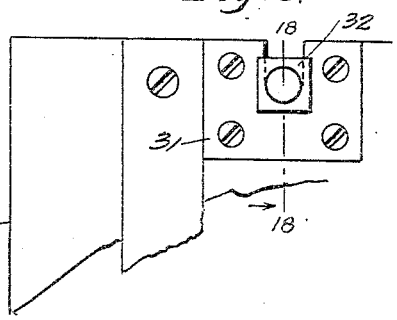
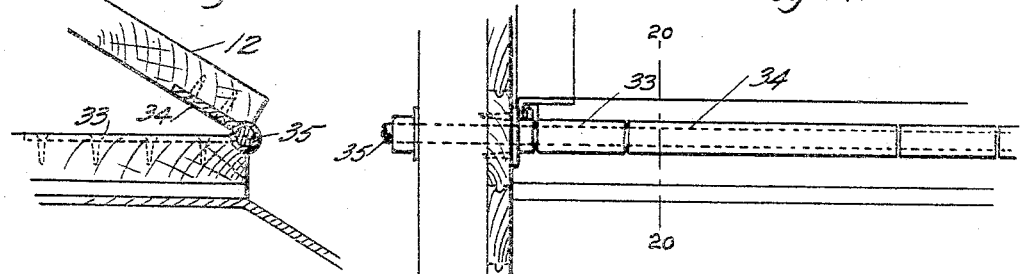
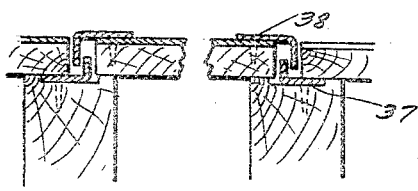
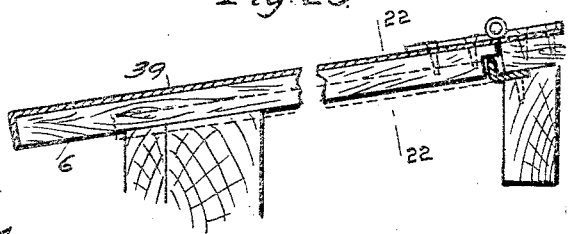
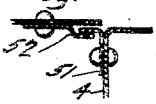

UNITED STATES PATENT OFFICE.

ARGYLE CAMPBELL, OF CHICAGO, ILLINOIS, ASSIGNOR TO ENTERPRISE RAILWAY EQUIPMENT COMPANY, OF CHICAGO, ILLINOIS, A CORPORATION OF ILLINOIS.

CONVERTIBLE FREIGHT-CAR.

1,071,029.  Specification of Letters Patent.  Patented Aug. 26, 1913.

Application filed April 29, 1910. Serial No. 558,328.

*To all whom it may concern:*

Be it known that I, ARGYLE CAMPBELL, a citizen of the United States, residing in Chicago, in the county of Cook and State of Illinois, have invented a new and useful Improvement in Convertible Freight-Cars, of which the following is a specification.

The invention relates to improvements in convertible freight cars as described in the present specification and illustrated in the accompanying drawings that form part of the same.

The invention consists in the novel construction and arrangement of parts whereby the conversion of the car from one type to another is much facilitated by the means employed toward supporting and arranging the several movable sections of the flooring in their several positions and adapting the car structure generally for convertible purposes.

The objects of the invention are to devise a form of freight car particularly suitable for the transportation of bulk freight in one direction on a journey and package or other freight on the return journey, and generally to effect this purpose in an efficient and comparatively inexpensive manner.

Figure 1 is a longitudinal section on line A—A of Fig. 2. Fig. 2 is a cross-sectional view of car on line B—B of Fig. 1. Fig. 3 is a plan view showing the floor of the car when in position for dumping or for hauling any granular material. Fig. 4 is a plan view of the floor converted into a merchandise car and having a level floor from end to end. Fig. 5 shows a longitudinal view taken at the same location as Fig. 1 but with some modifications as to the arrangement of the flooring. This figure shows a movable central cross hopper not shown in Fig. 1. Fig. 6 is a plan view showing the floor of the car when closed and converted as from Fig. 5. Fig. 7 is a plan view illustrating the means for locking the central cross hopper shown in Fig. 5. Fig. 8 is a cross-sectional view of a portion of the movable floor taken on line 8—8 of Fig. 1. Fig. 9 is a cross-sectional view of a portion of the central movable hopper taken on line 9—9 of Fig. 5, and is for the purpose of illustrating the means of firmly securing this section of flooring when in an upward position and for further preventing the leakage of any material from the car. Fig. 10 is a plan view of the same portion. Fig. 11 is a cross-sectional view of the portion of the end flooring shown in Fig. 5 and taken on line 11—11 and illustrates another means of applying this movable floor portion to prevent leakage. Fig. 12 is a cross-sectional view of a portion of the transverse central movable hopper shown in Fig. 5, this section being taken longitudinally of the car. Fig. 13 is a longitudinal section of the end of the car, taken on line 13—13 of Fig. 6, and is for the purpose of illustrating a means for securely fastening and preventing leakage at the movable edges of the floor. Fig. 14 is a plan view showing a portion of the flooring and the means for fastening same. Fig. 15 is a plate lying transverse of the car and shown in Fig. 1 at the bottom of the movable end floor, and is for the purpose of holding the floor in position, and will be more fully described. Fig. 16 is a cross-sectional view of Fig. 15, taken on line 16—16. Fig. 17 is a modification or an alternate for Figs. 15 and 16 and shows novel means for holding and securing the end flooring at the bottom. Fig. 18 is a cross-sectional view of the side-door of the car taken on line 18—18 of Fig. 1, and shows the means for locking the side grain door when in an upright position. Fig. 19 is a plan view of a portion of the same door taken at about the same location as Fig. 18. Fig. 20 is a cross-sectional view, showing the bottom hinges of the transverse central hopper, and also can be applied to the bottom of the movable end floor should it be desired to apply that floor in such a manner. The view is taken at line 20—20 of Fig. 21. Fig. 21 shows a plan view of the hinge of Fig. 20 and the continuous bolt from side to side of the car which the hinges rotate on. Fig. 22 shows a longitudinal cross-sectional view of a door of the roof of the car, and is taken on line 22—22 of Fig. 23. Fig. 23 is a transverse sectional view of the same door taken near its central portion. Figs. 24 and 25 are detail sections on lines 24—24 and 25—25 of Fig. 2.

Referring to the drawings, 1, 1ª are the side and end walls of the car.

2 is the central truss or sills.

3 are the hopper chutes extending from points intermediate of the length of the car beneath the flooring toward the center of said car.

4 are the doors closing the discharge openings at the ends of the hopper chutes 3.

5 is the roof having a suitable door opening therethrough.

6 is a door closing the opening in the roof and suitably hinged.

7 are the side doors of the car, of any suitable construction.

8 is the interior lining of the car.

9 are the mid sections of the flooring arranged to fold up to the sides and form part doors.

10 are movable intermediate sections of the flooring, extending from said mid sections.

11 are permanent end sections of the flooring extending from said intermediate sections to the end walls and 11ª is a permanent mid section of the flooring.

In Figs. 5 and 6 a slight modification of the arrangement of the flooring is shown in which 12 are intermediate sections adapted to turn backwardly and meet and form a peak centrally in the car. 13 are permanent strips of flooring to which the latter intermediate sections are hinged. 14 are brackets rigidly secured to the end walls intermediate of the height thereof and supporting the upper ends of said inclined ways, and 14ª are inclined supports secured to the side walls of the car for the longitudinal edges of the floor sections 10. 15 are hinged flaps secured to the end walls intermediate of the height thereof and adapted to cover the edges of said inclined ways. 16 are dogs pivotally secured to the end walls and securing said hinged flaps firmly on said inclined ways. 17 are metal strips extending from the brackets 14 and secured to the side walls of the car and terminating adjacent to the hopper chutes 3 and forming in conjunction with said brackets 14 and 14ª supports for said inclined ways or floor sections 10. 18 are metal strips on intermediate flooring 10 for the purpose of stiffening and forming grain tight joints with metal strips 17. 19 are transverse metal cleats under and above movable flooring 10 for stiffening and binding together the boards forming the sections of flooring. 20 are metal bindings shown on the bottom ends of said inclined ways or floor sections 10. 21 are plates extending across the car adjacent to the chute openings and rigidly secured and having upturned flanges forming cleats to retain said inclined ways in their upper positions. 22 are bolts journaled and slidably arranged in the brackets 22ª rigidly secured to the car structure adjacent to the chute openings and adapted to slide into corresponding bolt holes in the ends of the inclined ways. 23 are Z bars secured to the chute bottoms, extending thereacross and forming transverse recesses. 24 are plates secured to the underside of sections of the inclined ways and forming tongues entering the recesses formed by said bars, thus providing a modified way of retaining said inclined ways in their upper or inclined position. 25 are metal plates forming shields extending from the end walls over the top ends of said inclined ways. 26 are bolts extending through said shields 25 and through the ends of the car securely fastening said shields 25. 27 are beveled strips forming a backing for the plate 25. The said inclined ways are here shown as formed in sub-sections longitudinally divided, though it must be understood that they may be arranged each all in one piece. 28 are angle bars forming flanges on one edge of said sub-sections. 29 are metal strips secured to the outer edge of said sub-sections to the face of a projecting ledge, thus forming longitudinal recesses for the downwardly extending sections of said angle bars and forming grain-tight joints. 30 are bolts pivotally secured at their heads to the car structure at the side door openings and swinging inwardly. 31 is a slotted plate secured to the corresponding slotted portion of the said mid sections of flooring and adapted to receive said swinging bolts 30 in the "door" position of said mid section and to be secured therein by suitable nuts 32.

In the Figs. 5 and 6 in the aforesaid modified form of the invention the sections which turn backwardly and meet in a peak are secured by hinges of which 33 and 34 are the knuckle portions secured to a fixed strip of flooring and to said peak sections respectively. 35 is the pin of the hinge which extends completely across the car through said knuckle portions. This form of hinge may be used for other sections of the movable flooring, as for instance it may be used to attach the inclined ways to the permanent end sections. 37 are angle bars secured to the door-jamb around the roof door opening and forming recesses therearound. 38 are angle bars secured to the upper side of the roof-door and having downwardly bent flanges extending into said recesses formed by the angle bars 37 secured to the door jamb, thus forming a suitable joint between the door jamb and the roof door. 39 is a sheet covering over said roof door and formed of metal or canvas.

In further describing this invention, it will be noted, see Figs. 1 and 2, that the car has a fixed end floor and a movable intermediate floor, said intermediate floor being movable from the inclined position shown in Fig. 1 in full lines to the horizontal position indicated in dotted lines; also that the side door is movable from the vertical position shown in full lines in Figs. 1 and 2, to the position shown in dotted lines in Fig. 2, this being more clearly illustrated in Figs. 3 and 4. The novel arrangement is in these parts and the additional possibilities shown in Figs. 5 and 6 by conversion to similar parts.

The two transversely hinged dump doors 4, 4 for each pair of chutes 3, 3 are connected together by a bridge member or bar 40 and are simultaneously opened and closed by an operating shaft 41, journaled in suitable bearings 42 secured to the center sills and provided with a polygonal, preferably four sided, winding drum 43, having pivot ears or lugs 44, connected by links 45, 46, 47, 48 and 49 with the bridge member 40.

The dump doors 4 and chutes 3 are provided at their meeting edges or faces with interengaging devices 50, 51, 52, 53, to form grain tight joints between the doors and chutes.

A feature of my invention is the simple and practicable means employed for application of the various parts which go to strengthen the members, making them easily handled, preventing the loss of load when in transit and effectively making the car adaptable to many services.

54 shown in Figs. 9 and 10 is a movable metal strip for securely fastening floor section 12. 55 is a metal recess in movable door 9 for receiving plate 54. 56 are bolts securing plate 54 to floor 12. 57 in Fig. 12 is metal strip on floor 12 and fits in metal recess 58 on adjacent flooring. 59 of Fig. 7 are bolts for binding floors 12. 60 is a metal piece in which bolt 59 fastens. Each of the bolts 59 preferably has an eye for hinging it to one of the metal pieces 60 on one door and a nut to engage the companion metal piece 60 on the adjacent door, such companion metal piece preferably having a slot, crotch or recess to receive the bolt, formed by a pair of upstanding lugs on the metal piece 60, so that the nut need only be loosened to permit disengagement.

I claim:—

1. In convertible cars of the class described, a car body having side and end walls, hopper chutes beneath the level of the flooring and movable sections in said flooring adapted to form inclined ways from said end walls to said chutes, brackets rigidly secured to said end walls having beveled upper sides and forming supports for the upper ends of said inclined ways, hinged flaps secured to said end walls and extending thereacross and over the upper surface of said inclined ways at the top ends and dogs pivotally secured to the said end walls and adapted to hold said flaps firmly on said ways, substantially as specified.

2. In convertible cars of the class described, a car body having side and end walls, hopper chutes beneath the level of the flooring and movable sections in said flooring adapted to form inclined ways from said end walls to said chutes, and plates of metal rigidly secured to the car frame adjacent to said chutes and having upturned flanges forming cleats adapted to engage the lower ends of said inclined ways, substantially as specified.

3. In convertible cars of the class described, a car body having side and end walls, hopper chutes beneath the level of the flooring and movable sections in said flooring adapted to form inclined ways from said end walls to said chutes, cleats rigidly secured to the car frame adjacent to said chutes and adapted to engage the lower end of said inclined ways and bolts journaled and slidably arranged in suitable brackets attached to the car frame and adapted to enter corresponding bolt holes in the lower ends of said inclined ways, substantially as specified.

4. In convertible cars of the class described, a car body having side and end walls, hopper chutes beneath the level of the flooring and movable sections in said flooring adapted to form inclined ways from said end walls to said chutes, metal plates extending transversely across said chutes at the entrance end thereof and secured thereto, said inclined ways having coöperating plates secured thereto at the lower ends thereof, substantially as specified.

5. In a convertible car, a car body having side and end walls and door openings in said walls and flooring formed in sections, said flooring having movable mid sections slotted at the edge thereof and adapted to fold upwardly and form part doors across said openings and corresponding slotted plates secured to said doors, threaded bolts hinged at their heads to the car structure at the door opening and swinging inwardly into said slots and nuts mounted on said bolts and adapted to secure said bolts in said slots in the part door position of said mid sections, substantially as specified.

6. In a convertible car, a car body having side and end walls and flooring in sections movable and fixed, said movable sections having outwardly extending and downwardly turned flanges at the outer longitudinal edges thereof and strips extending along the side walls of the car in oblique directions at each end thereof having upwardly extending flanges therefrom forming recesses for the aforesaid flanges from the movable sections, substantially as specified.

7. In a convertible car, a car body having side and end walls, a movable intermediate floor section, a transverse floor strip having upwardly turned lips for the purpose of preventing the downward movement of said movable floor section, said movable floor section having a bolt hole, and a movable bolt movable in or out of said hole and serving to bind the movable floor section in a secure position when serving as a portion of the hopper or inclined way, substantially as specified.

8. In a convertible car, the combination with a box car body having a central, longitudinal sill, end walls and side walls furnished with side door openings and side doors, fixed end floor sections, a fixed mid floor section and fixed inclined chutes extending longitudinally toward the middle of the car, transversely hinged dumping doors opening toward each other and closing the inner ends of said inclined chutes and movable intermediate floor sections extending from the outer ends of said inclined chutes to the end walls of the car, said intermediate movable floor sections comprising a plurality of sub-sections slidably connected together, substantially as specified.

9. In a convertible car, the combination with a box car body having a central, longitudinal sill, end walls and side walls furnished with side door openings and side doors, fixed end floor sections, a fixed mid floor section and fixed inclined chutes extending longitudinally toward the middle of the car, transversely hinged dumping doors opening toward each other and closing the inner ends of said inclined chutes and movable intermediate floor sections extending from the outer ends of said inclined chutes to the end walls of the car, said intermediate movable floor sections comprising a plurality of sub-sections furnished at their longitudinal edges with interengaging devices for forming grain tight joints between the sub-sections, substantially as specified.

ARGYLE CAMPBELL.

Witnesses:
H. M. MUNDAY,
E. ABRAMS.